United States Patent
Rahim et al.

(10) Patent No.: US 8,042,085 B2
(45) Date of Patent: Oct. 18, 2011

(54) METHOD FOR COMPACTION OF TIMING EXCEPTION PATHS

(75) Inventors: Solaiman Rahim, San Francisco, CA (US); Manish Bhatia, Delhi (IN); Housseine Rejouan, Fremont, CA (US)

(73) Assignee: Atrenta, Inc., San Jose, CA (US)

( * ) Notice: Subject to any disclaimer, the term of this patent is extended or adjusted under 35 U.S.C. 154(b) by 352 days.

(21) Appl. No.: 12/206,473

(22) Filed: Sep. 8, 2008

(65) Prior Publication Data
US 2010/0064263 A1    Mar. 11, 2010

(51) Int. Cl.
*G06F 17/50* (2006.01)
(52) U.S. Cl. ........ 716/132; 716/104; 716/106; 716/111; 716/119; 716/126; 703/16
(58) Field of Classification Search .......... 716/6, 2, 716/104, 106, 132, 107, 108, 109, 111, 119, 716/126; 703/16
See application file for complete search history.

(56) References Cited

U.S. PATENT DOCUMENTS

| | | | |
|---|---|---|---|
| 5,638,290 A * | 6/1997 | Ginetti et al. | 716/2 |
| 5,726,996 A | 3/1998 | Chakradhar et al. | |
| 6,678,644 B1 | 1/2004 | Segal | |
| 6,964,027 B2 * | 11/2005 | Kucukcakar et al. | 716/2 |
| 7,818,700 B2 * | 10/2010 | Muller-Brahms | 716/123 |
| 7,962,886 B1 * | 6/2011 | Pandey et al. | 716/136 |
| 2004/0210861 A1 * | 10/2004 | Kucukcakar et al. | 716/6 |
| 2007/0011527 A1 | 1/2007 | Goswami et al. | |
| 2007/0088999 A1 | 4/2007 | Chao et al. | |
| 2007/0113135 A1 | 5/2007 | Rajski et al. | |
| 2008/0098271 A1 * | 4/2008 | Muller-Brahms | 714/738 |

FOREIGN PATENT DOCUMENTS

JP    2000222452 A * 8/2000

* cited by examiner

*Primary Examiner* — Phallaka Kik
(74) *Attorney, Agent, or Firm* — Sughrue Mion, PLLC

(57) ABSTRACT

A technique and apparatus for reducing the complexity of optimizing the performance of a designed semiconductor circuit is disclosed. This technique of path compaction is used to reduce the time taken for optimization. The path compaction tool is used in design optimization to reduce the optimizer execution time. Compaction helps readability, usability and reduces synthesis and static timing analyzer (STA) runtime. The aim of path compaction is to reduce the number of constraints the optimizer has to go through during the optimization process. Path compaction has three dimensions. The first is to reduce number of "-through" elements in the constraint, thereby reducing the complexity of constraints developed The second is to combine the paths to reduce the number of constraints. The third is to combine the constraints to reduce the number of constraints to be checked and optimized. Path compaction is used when generating timing exception using timing exception tools.

16 Claims, 9 Drawing Sheets

Logic diagram for Single Fanout Net Removal

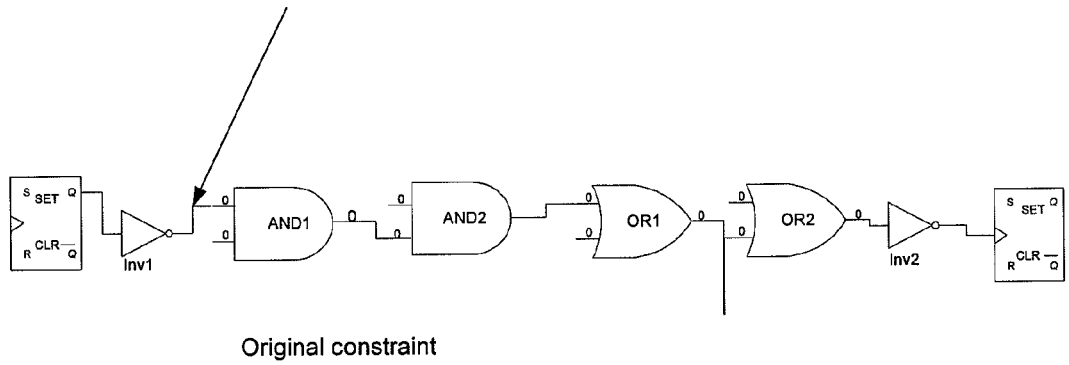

Single fanout net

Original constraint

Set_false_path −from FF1 -th AND1/in1 −th AND2/in2 -th OR1/in1 −th OR2/in2 −th INV2 -to FF2

After fan out removal becomes

Set_ false _ path −from FF1 -th AND in1/1 − th OR2/in2 −to FF2

FIGURE 4

Logic Diagram for Multiple Fanout Net Removal

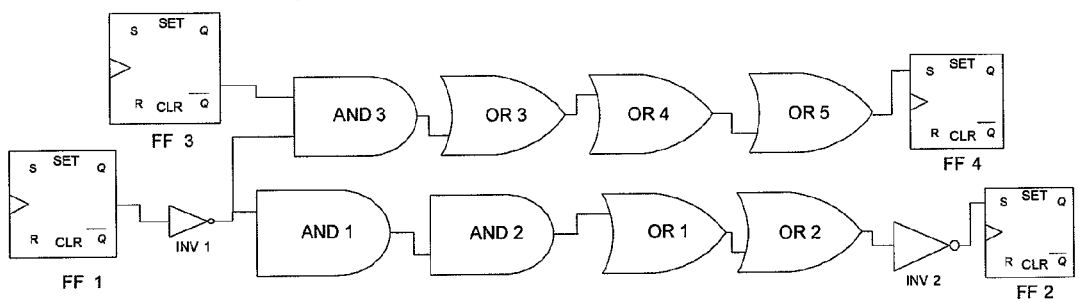

Original constraint

Set_false_path -fromFF1 -th INV 1 -th AND 1/in1 -th AND 2/in 2 -th OR 1/in 1 -th OR 2/in 2 -th INV 2 -to FF 2

After fan out removal becomes

Set_false_path -from FF1 -th OR 2/in 2 -to FF 2

FIGURE 5

Logic diagram where multiple fan out can NOT be removed

Set_false_path -from FF 1 -th INV 1 -th AND 1/in 1 -th AND 2/in 2
-th OR 1/in 1 -th OR 2/in 2 -th INV 2 -th FF 2

This is not reducible to: Set_false_path -from FF 1 -th OR 2/in 2 -to FF 2

Logic Diagram for Removal of -from and -to List

Original Path:

Set_false_path –from { A[0], A[1], A[2]} –th OR 1/in 1 -th OR 2 /out –to {B[0], B[1], B[2]}

Reduced Path: Set_false_path -th OR_1/in 1 –th OR 2/out

Logic for Compaction of -from list and -to List including all the bits of a Bit Vector Original path: Set_false_path –from {A[0], A[1], A[2]} -th OR 1/in1 –th OR 2 /out -to {B[0], B[1], B[2]}

Reduced Path: Set_false_path –from A[*] -th OR 1/in1 –th OR 2/out –to B[*]

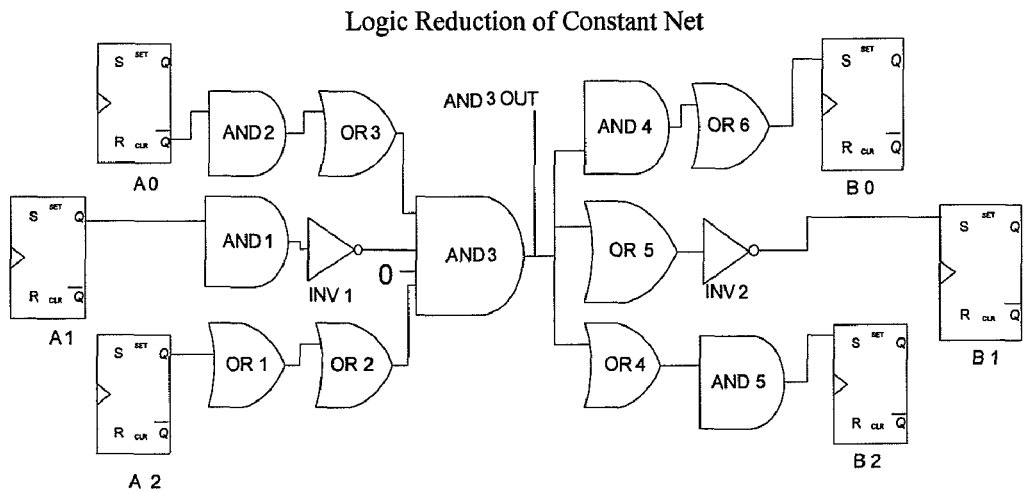

Logic Reduction of Constant Net

Original Constraint

Set_false_path –from {A[0] }, –th AND 2/out, -th OR 3/out, -th AND 3/out, -th OR 5/out,
- th OR 6/out, - to {B[0]}    =(P1)

Set_false_path –from {A[1] }, –th AND 1/out, -th INV 1/out, -th AND 3/out, -th OR 5/out,
- th INV 2/out, - to {B[1]}    =(P2)

Set_false_path –from {A[2] }, –th OR 1/out, -th OR 2/out, -th AND 3/out, -th OR 4/
out, - th AND 5/out, - to {B[2]}    =(P3)

After First compaction

Set_false_path –th AND 3/ out        =(P1)

Set_false_path –th AND 3/ out        =(P2)

Set_false_path –th AND 3/ out        =(P3)

After Final compaction

Set_false_path –th AND 3/ out        =(P)

FIGURE 9

Logic Diagram for a New Constraint for Re-convergent Net

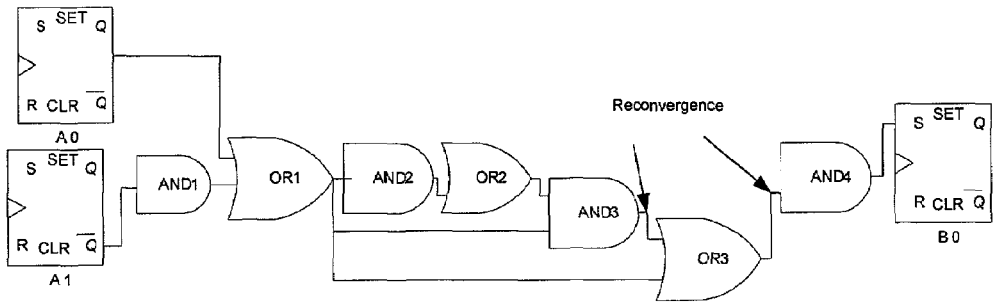

Original constraint

Set_false_path -from{A[1] }, -th AND 1/out, -th OR 1/out, -AND 2/ out, -th OR 2/out, -th AND 3/out, -th OR 3 /out, -th AND 4/out, -to {B[0]}    =(P1)

New constraint with only re-convergent path

Set_false_path -th OR 1/out -th AND 3/ out -th OR 3 /out    =(P2)

Is C2 a valid falss_path? => yes, replace (P1) by (P2)

FIGURE 10

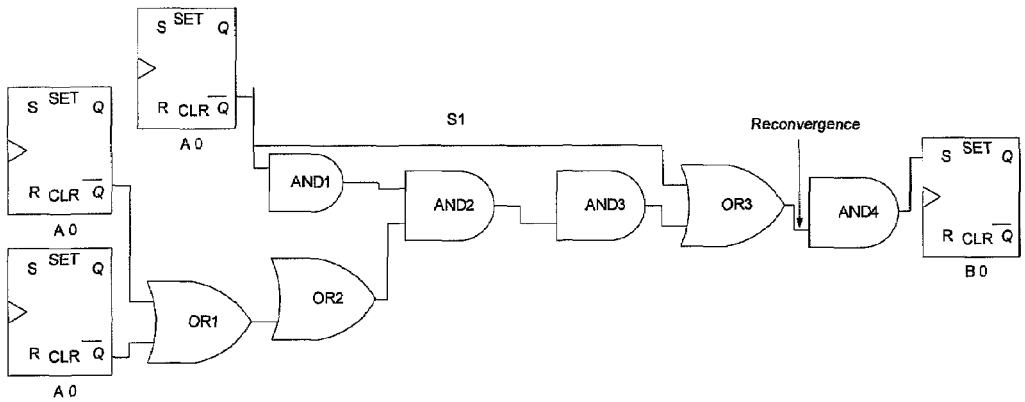

Original constraint

Set_false_path -from {A[0]}, -th OR_1/out, -th OR_2/out, -th AND_2/out, -th AND_3/out, -th
    OR_3/out, -th AND_4, -to {B[0]}    = (P1)

New constraint with only re- convergant path.

Set_false_path -th OR_2/out, -th AND_2/out, -th AND_3/out, -th OR_3/out    = (P2)

FIGURE 11

```
CompactTE(list_TE) {
    Apply dimension1_compaction (list _ TE )
    Apply dimension2_compaction (list _ TE ) ;
    If(txv do advancedpath_compaction) {
        Apply advancedpath_compaction(list _TE) ;
    }
    if(txv path_compactionrate !=-1) {
        removepath from list(list_TE, txv path_compactionrate);
    }
    if(txv do sanity checking) {
        verify TE(list_TE);
    }
    return list_TE
}
Generate_TE ( ) {
    list_TE = verify_TE(list_candidatepath) ;
    If(txv do path_compaction) {
        CompactTE(list_TE);
    }
    return list_TE;
```

FIGURE 12

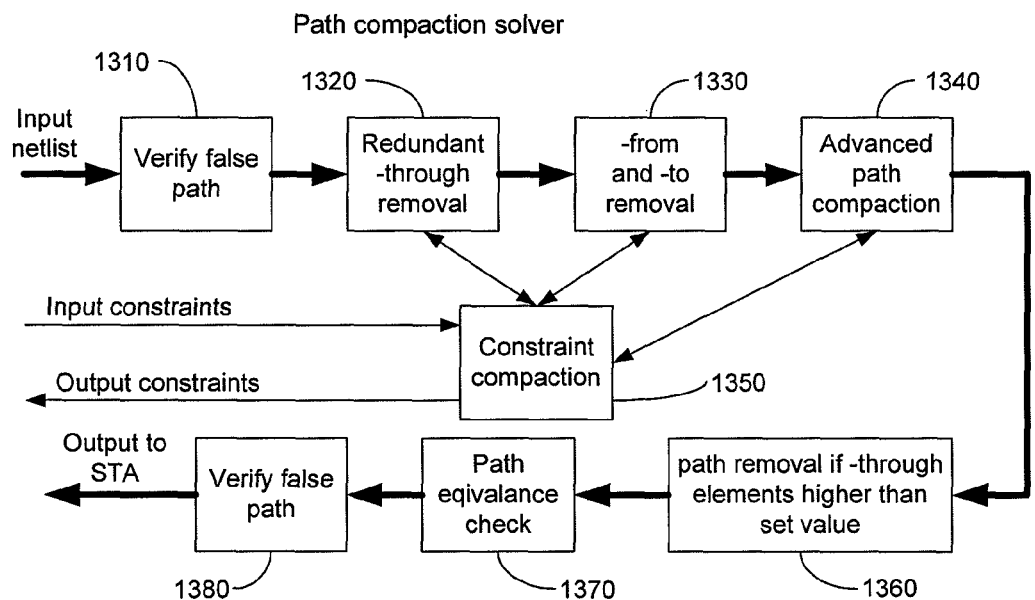

FIGURE 13

METHOD FOR COMPACTION OF TIMING EXCEPTION PATHS

TECHNICAL FIELD

The invention relates to design optimization, synthesis, and verification of semiconductor circuits and more specifically to enabling a faster design optimization and synthesis, as well as making the design readable and easily synthesizable.

BACKGROUND OF THE INVENTION

As integrated circuits (ICs) are produced with greater and greater levels of circuit density, efficient methods for optimization of the designed circuits are needed. In any design, it is essential to optimize the testing of circuits, to meet the design criteria, as optimizing the circuits makes them compact and easily understandable and traceable. It also allows improved testing schemes that guarantee very high fault coverage while minimizing test costs.

Typically, ICs are presently designed by using high level languages and synthesized to achieve the Resistor Transistor Logic (RTL) level implementation. In most cases, the design implementation includes a number of redundant or non-active paths (false paths) and multi clock paths (MC Paths). All these constitute 'do not care' paths for the performance of the functional design. In a typical design, each path in the design is provided a constraint. During optimization, these paths are optimized individually based on the constraint associated to it. This is done prior to passing it to the design compiler to do the optimization and generate the net list. Since each path constraint has to be checked individually during optimization, the time taken for optimization is dependant on the number of paths with associated constraints. A typical prior art design flow 100 is shown in FIG. 1. The RTL design is provided typically to a design compiler 110 with the design criteria 101, to initially generate a set of constraints, optimize the path based on the constraints in the analyzer/optimizer 111, and then, using the synthesizer 112, generate a gate level design. This is then used to generate a design net list and associated constraints 113. This net list and constraints 113 are passed through functional test in the functional testing block 130, as well as into a static timing analyzer (STA) 150 to check if the design meets the design criteria. If not, a new set of requirements is generated to achieve the design criteria based on the output of functional testing block 130 or STA 150. The process of design compilation is repeated with constraint generation, followed by path optimization, and re-compilation using the new set of constraints. This is an iterative process of optimization, regeneration of constraints, generating the net list and running timing analysis in the STA 150 to verify the timing. The iterative process is run till the timing and other design criteria are met. Each time the synthesizer 110 is run, it provides inputs which are used to generate constraints and further attempts to optimize these paths. Hence, the number of paths and constraints play a large roll in the time taken for the optimization and synthesis of an IC.

In view of the limitations of the prior art, it will hence be advantageous to enable further reduction of the number of paths and constraints associated with a circuit at the RTL level, prior to using the design compiler, to reduce the time taken for optimization and make it more compact and readable. It will be further advantageous to reduce complexity by optimization for improving the performance, testability and traceability of the circuits.

BRIEF DESCRIPTION OF THE DRAWINGS

FIG. 4 is a diagram for single fanout net removal.

FIG. 5 is a diagram for multiple fanout net removal.

FIG. 9 is a diagram of constant net.

FIG. 10 is a diagram of a re-convergent net.

FIG. 11 is a diagram of a re-convergent net with side input of the path.

FIG. 12 is a exemplary set of instructions according to an embodiment of the present invention.

FIG. 13 is a design flow in accordance with the principles of the disclosed invention.

DETAILED DESCRIPTION OF THE INVENTION

A technique and apparatus for reducing the complexity of optimizing the performance of a designed semiconductor circuit is disclosed. This technique of path compaction is used to reduce the time taken for optimization. The path compaction tool is used in design optimization to reduce the optimizer execution time. Compaction helps readability, usability and reduces synthesis and static timing analyzer (STA) runtime. The aim of path compaction is to reduce the number of constraints the optimizer has to go through during the optimization process. Path compaction has two dimensions: the first is to reduce number of "-through" element in the constraint, thereby reducing the complexity of constraints developed, and the second is to combine the paths to reduce the number of constraints to be checked and optimized. Path compaction is used when conducting timing closure by timing exception tools. Such tools may include Timing Exceptions Verification (TXV) or, when generating timing exception at RTL level, using Timing Exceptions Generation (TXG).

A path is defined as a synchronous or clocked connection from a 'from' element to a synchronous 'to' element, via a number of 'through' elements that are typically asynchronous in nature. Each such path in a design is typically associated with constraints that are used to optimize the path to enable timing closure during timing analysis by the STA. Acting as Applicant's own lexicographer, for the purpose of this application, a "from element" is defined as the starting point of a timing exception constraints, a "to element" is defined as the ending point of a timing exception constraints, a "through element" is defined as a point defining the paths of a timing exception constraints, a "to list" is defined as a set of to elements, a "from list" is defined as a set of from elements, and a "through list" is defined as a set of through elements.

Figure 1:
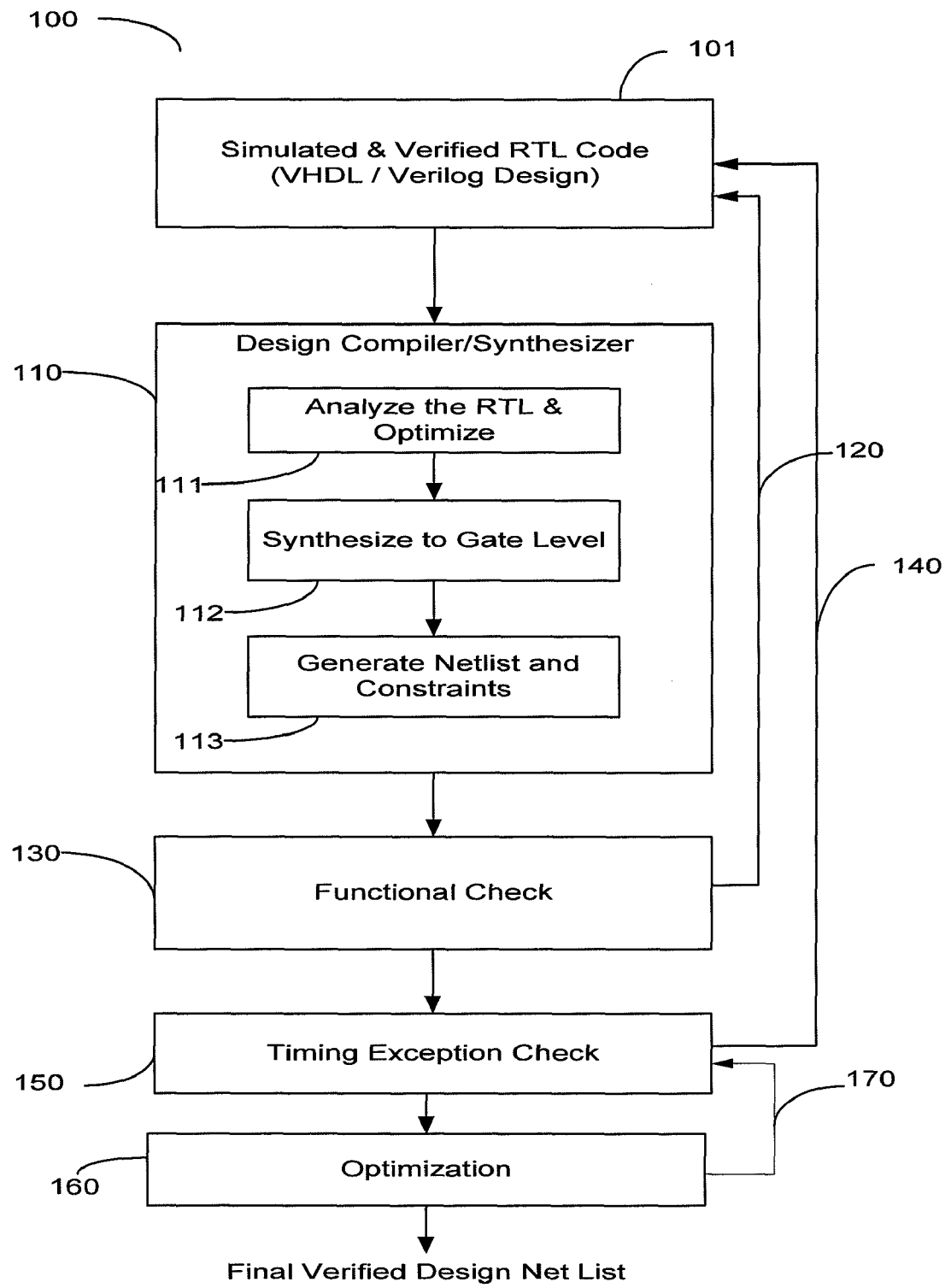
FIG. 1 is a prior art flow of the RTL design flow to produce the design net list.
Figure 2:
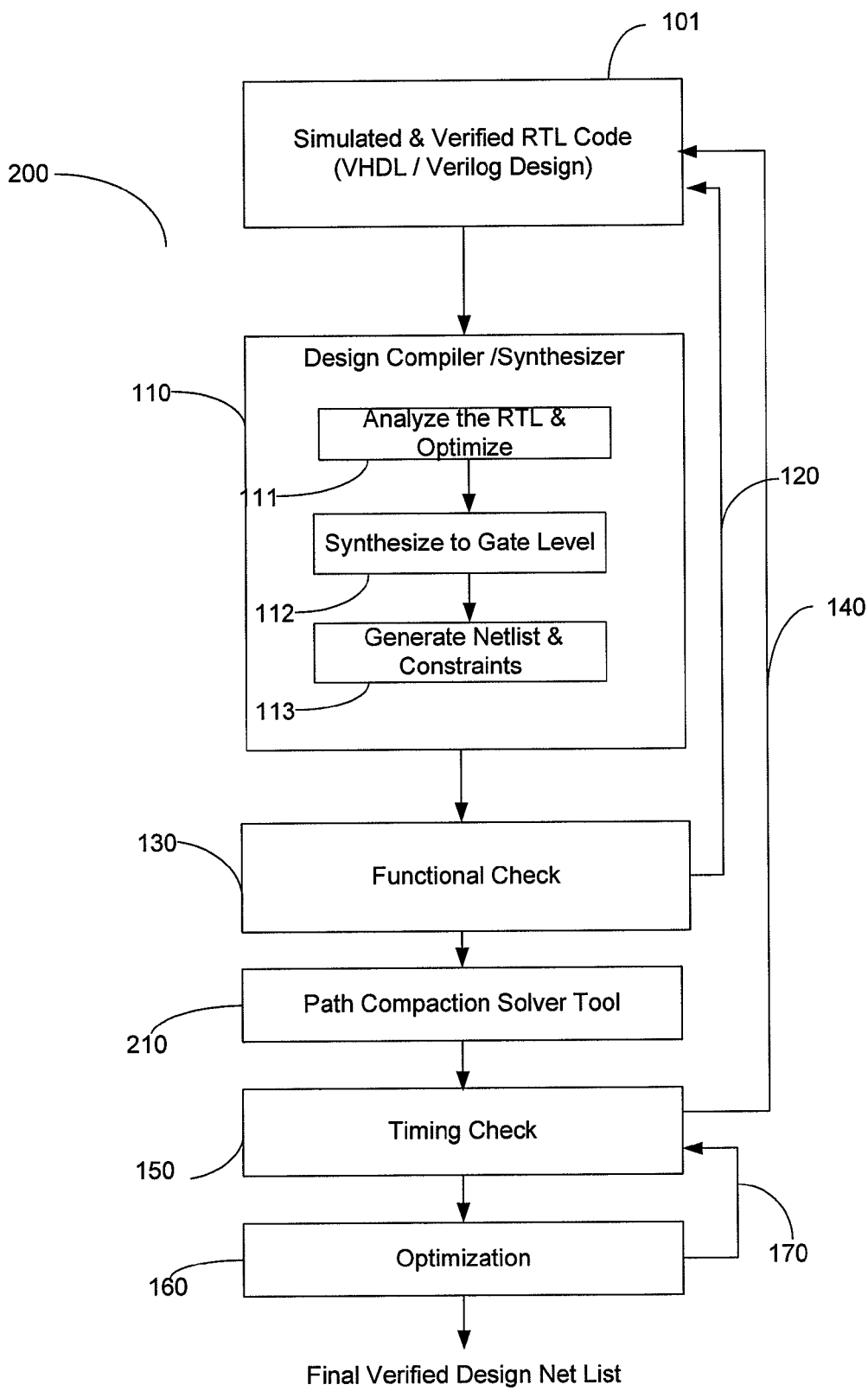
FIG. 2 is a modified RTL design flow having a compaction module in accordance with the principles of the disclosed invention
Figure 3:
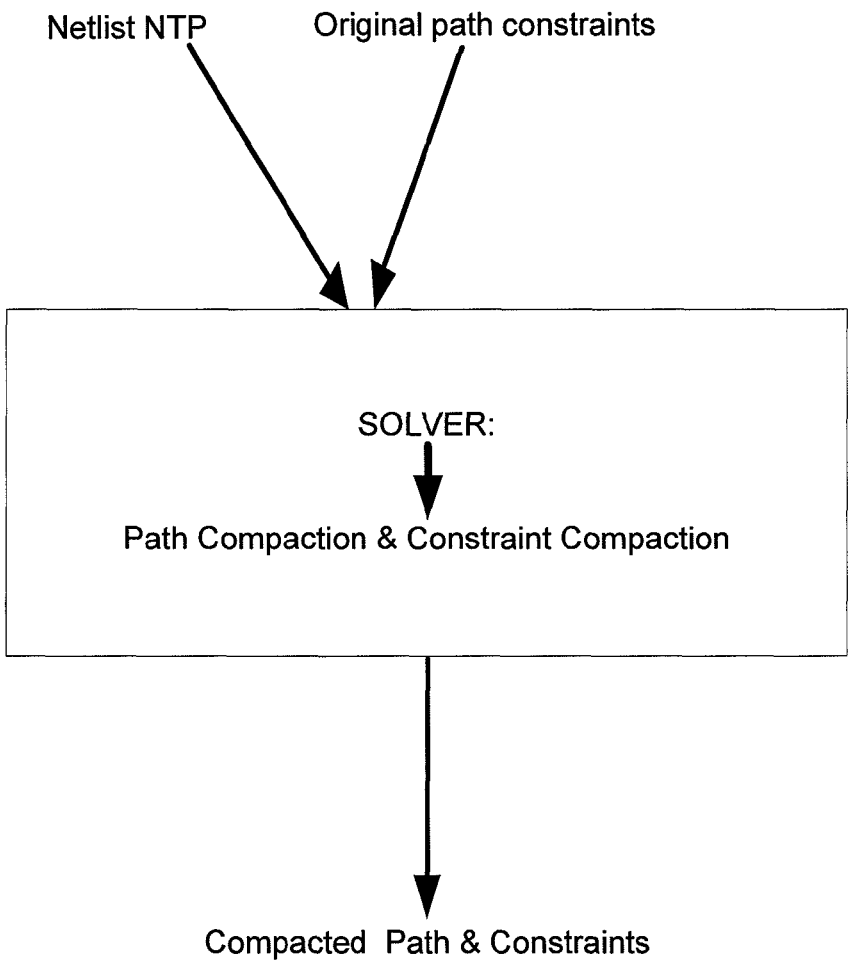
FIG. 3 is a diagram showing input requirements and outputs for path compaction.

A path compaction tool uses the path compaction technique, typically in a solver, as a means for reducing the unnecessary or redundant circuit paths and constraints set for these paths, that are identified as false paths and multi-cycle paths. A false path can be defined as a path that does not impact the functionality of the design. A multi-cycle path can be defined as a path that has more than one clock to transit the path. Such a design flow 200 is shown in FIG. 2. Once a path is identified as a false path, it is possible to reduce the through elements and the number of constraints associated with the path. It is also possible to combine multiple paths and have a single set of constraints for the paths. This reduction in paths, through elements and constraints, has to be done without impacting the functional and timing constraints set by the design. The path to be compacted will have to be a topological path for the compaction tool to operate on. The path compaction technique can be applied to paths in circuits that meet a set of predefined conditions. The following inputs will be required to perform path compaction as further illustrated in FIG. 3:

1. Constraint to compact, typically in a format that is used by the solver used for compacting, derived from the initial timing report of the synthesizer;

2. Net-list in the format needed by the solver from the synthesizer output; and, 3. As the constraint to be optimized and path come from the synthesizer and timing report, the path to compact is a complete path with a single element in the "-from", "-through" and "-to" lists.

Path Compaction Success Criteria

Path compaction is considered a success when certain success criteria are met after the compaction operation. The following are the typical path compaction success criteria:

1. The compacted constraint file generated has correct constraints to enable compacting operation;

2. The generated constraints associated with the false paths and the input constraints for the other paths are included as a part of the compacted constraints;

3. The runtime increase, if any, to enable path compaction is not a large component of the total runtime of the tool; typically this should be less than 10% of the run time of the tool without compaction;

4. The compacted constraints generated should have less "through elements", to provide the optimization of the circuit; and, 5. The compacted constraint file generated has under preferred conditions, less constraints than the original constraints file generated with no compaction.

Path Compaction

Path compaction operates by identifying a single path with a start "from" and an end "to" synchronous elements and reducing the redundant "through" asynchronous elements based on a set of input constraints.

A. Physical Path Compaction

Several new methods/algorithms, though not meant to be exhaustive, used to eliminate "-through" elements from the constraints are presented as examples of physical path compaction:

1. Redundant "-through" Removal

A redundant "-through" element is a net which leave invariant the definition of the path in a constraint by removing it from its description.

1.1. Single Fanout Net Removal

All "-through" elements with only a single element in their fanout list can be removed from the constraint. Indeed, a constraint can be defined with only "-through" elements with multiple element in their fan out list. An example is given in FIG. 4. In particular, because only "-th INV__1/out" and "-th OR__1/out", which correspond to "-th AND__1/in 1" and "-th OR__2/in 2" in the constraint, are multiple fan-out nets, all other "-through" elements can be removed without changing the constraint.

1.2. Multiple Fanout Net Removal

A "-through" element with multiple fan-out can be removed if there is only a single fan-out converging to the path before the next "-through" element.

For instance, FIG. 5 illustrates an example where a "-through" element with multiple fan-out can be removed. In this example, the driver INV__1/out has two fan-outs. However, only one of them reaches OR__2/in 2 and hence "-th OR__2/in 2", or another "through" element from "-th AND__1/in 1" to "-th INV__2/out", cannot be removed.

Figure 6:
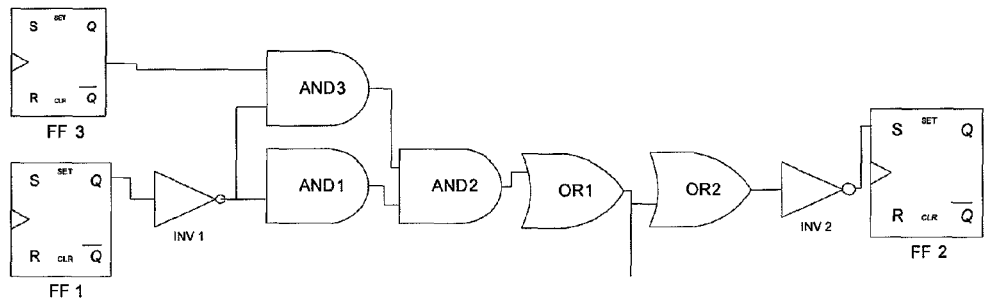
FIG. 6 is a diagram where multiple fanout cannot be removed.

FIG. 6 illustrates another example where the "-though" element, having a multiple fanout cannot be removed. In this example, the driver INV__1/out has two fan-outs. Both of them reach OR__2/in 2. Therefore removing AND__1/in1 from the constraint will change the constraint by adding a new path going through AND__3/out.

2. "-from" and "-to" Removal and Compaction

It is also possible to have compaction or reduction of the element in the "-from" and "-to" list. Having multiple elements in the "-from" and "-to" list is possible after completion of the design.

2.1. Removal of "-from" and "-to" List

If the "-from" list includes all the elements in the fan in of the first "-through" element of the path, then the "-from" list can be removed. Similarly, if the "-to" list includes all the elements in the fan out of the last "-through" element of the path, then the "-to" list can be removed.

Figure 7:
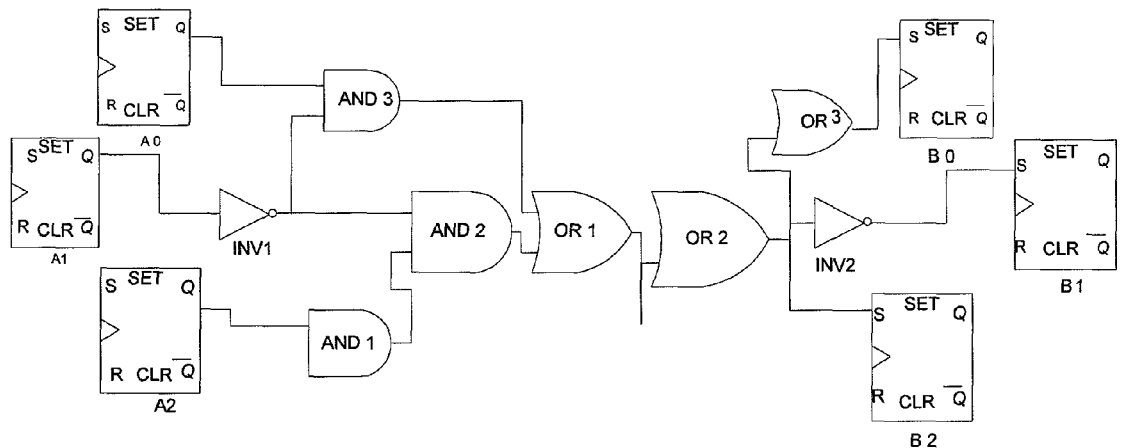
FIG. 7 is a diagram for removal of "-from" and "-to" list.

In the example of FIG. 7, the "-from" list includes all the flops in the fan in of the pin OR__1/in 1 and the "-to" list includes all the flops in the fan out of the pin OR__2/out. Therefore, the "-from" and the "-to" list can be removed without changing the path description of the constraint.

2.2. "-from" and "-to " List Compaction

If the "-from" list and "-to" list includes all the bits of a bit vector, then they can be included using a regular expression.

Figure 8:
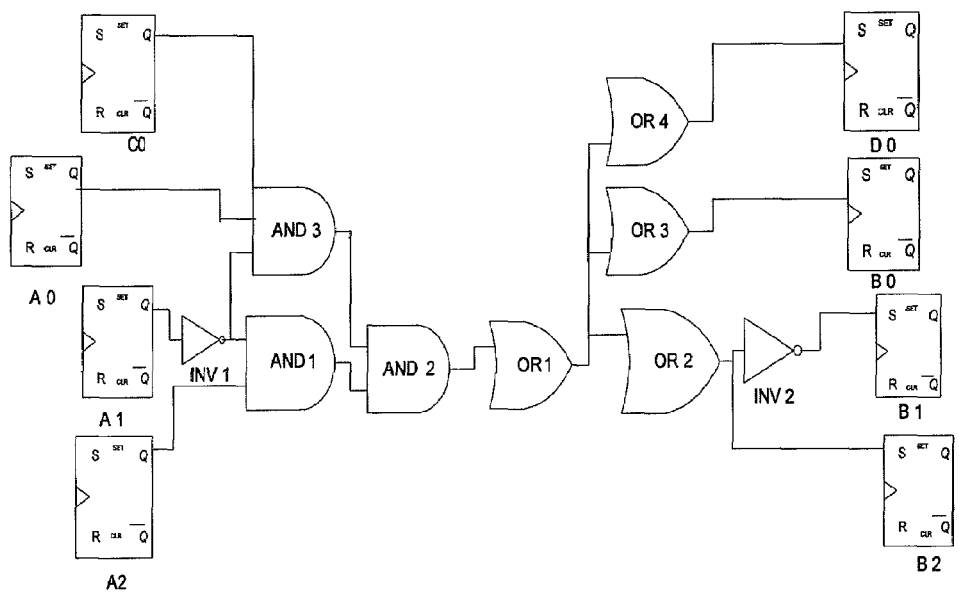
FIG. 8 is a diagram for compaction "-from" list and "-to" list including all the bit of a bit vector.

For instance, in the example of FIG. 8, the "-from" and "-to" list includes respectively the bits 0,1,2 of the bit vector A[0:2] and B[0:2]. Therefore, the "-from" and "-to" lists can be compacted respectively to A[\*] and B[\*].

B. Constraint Compaction

Once the physical path compaction is done, further simplification of the tests is accomplished by compacting the set of constraints that cover the paths. The following are examples of the new constraint compaction provided merely as examples and not by way of limitation. For the purpose of simplicity, the following discussion of constraint compaction assumes that the constraints to be compacted do not contain reconvergence.

1. Constraint Inclusion (with "-through" List)

If a constraint C1 has all its "-through" elements included in the "-through" list of constraint C2, then the constraint C1 can be merged with constraint C2 by merging the "-from" list and "-to" list of both constraints and by keeping the "-through" list of constraint C2.

For a non-limiting example, consider the following constraints:

set_false_path -from A1 -th A2 -th A3 -th A4 -to A5 (C1)
set_false_path -from B1 -th A2 -th A3 -th A4 -th B2 -th B3 -to B4 (C2)

The "-through" list of C1 is T1={A2, A3, A4}, the "-through" list of C2 is T2={A2, A3, A4, B2, B3}. As can be seen, T1 ⊂ T2. Therefore, C1 and C2 can be merged together into a single constraint C defined as follow:

set_false_path -from {A1, B1} -th A2 -th A3 -th A4 -th B2 -th B3 -to {A5, B4} (C)

This algorithm does not guarantee that all constraints included in the constraints will be merged. This is because the definition of a constraint is not canonical, i.e., the same constraint can be defined using different "-through" elements.

2. Constraint Inclusion (without "-through" List)

If the constraint C1 and C2 are defined only by using "-from" and "-to" list, then C1 and C2 can be merged if all the element in the "-from" list of C1 are in the fan-in of all the element of the "-to" list of C2 and mutually.

For a non-limiting example, consider the following constraint:
set_false_path -from A1 -to A2 (C1)
set_false_path -from B1 -to B2 (C2)

If $\{A1\} \subset$ Fan-in(B2) and $\{B1\} \subset$ Fan-in(A2), then the constraint $\overline{C1}$ and C2 can be $\overline{merged}$ to obtain the single constraint C defined as follows:
set_false_path -from $\{A1,B1\}$ -to $\{A2,B2\}$ (C)

C. Advanced Path Compaction—Constraint Rewriting

Constraint rewriting consists of creating a new constraint. The original constraint is included in the new one. This means that the paths of the original constraint are included into the ones of the new constraints and that the new constraints remain a correct false path. The goal of constraints rewriting is to increase the number of paths in the constraint in order to decrease the number of "-through" elements and the number of constraints.

Constraint rewriting is a complicated problem as it requires finding out the reason for any path to be false. New methods are available in order to find the reason of the path to be false. These methods are used only under a special switch and the result may require functional and timing checks to be repeated. This may impact the runtime. Another switch is typically used in order to provide a keep or not keep capability for the new constraint based on whether the rewritten constraint is acceptable or not.

1. Constant Net

If a net is constant, then all the paths going through this net are false paths. In this case, the constraint can be reduced by only specifying this net. Then, all constraints having this net in their specification can be merged into a single one. Note that the number of paths may be higher than in the original constraint file.

In the example of FIG. 9, the net AND_3/out is stuck at '0'. Therefore, all the constraints can be merged into the single constraint set_false_path -th AND_3/out.

2. Re-Convergent Net

As many of the false paths are due to re-convergent nets, the method used consists of finding all the re-convergent nets in the path and considering all the paths going through those nets as false paths. If, on running the new constraint, it is proved that the path are false, the new constraint is kept otherwise rejected.

This flow is illustrated in the exemplary and non-limiting FIG. 10. The re-convergent net are OR_1/out, AND_3/out and OR_3/out. The new constraint C2 is created to cover this path. Then, if the verification concludes that the paths are valid false paths and hence the constraint C1 is replaced by the constraint C2. Note that the constraint C2 includes more paths than the constraint C1.

The re-convergence of the side input of the path is not considered here. This type of checking will definitively help to find the reason for the path to be false but it is difficult to implement. For example, the first implementation of the method is not able to replace the constraint C1 by the constraint C2 in the example of FIG. 11 because the net S1, which re-converges into the net P2, is in the side input of the path and not in the path itself.

D. Implementation

An exemplary and non-limiting sequence of instruction is described in FIG. 12 and a block diagram is shown in FIG. 13. First, it is checked that the paths are false or not. Then, if path compaction is enabled (-txv_do_path_compaction), the compaction methods described in section A "physical path compaction" sub-section section 1.0—redundant "through" removal—is enabled. This is followed by path compaction described in section A "physical path compaction" sub-section section 2.0 "-from" and "-to" removal and compaction. If advanced path compaction is enabled (-txv_do_advanced_path_compaction), during implementation, then, the advanced path compaction flows illustrated in section C is also completed.

Once path compaction has been completed, the resultant constraints are further processed to reduce the total number of constraints by constraint compaction as discussed in section B on constraint compaction.

The typical compaction block diagram is shown in FIG. 13. The input to the blocks are the netlist and the constraints associated with the paths in the net list. The input is first checked to identify and verify the false paths in block 1310. These paths are processed through the block 1320 where redundant "through" units are compacted. This is followed by the "-from" and "to" removal and compaction in block 1320. Then the advanced compacting is done in block 1330. The constraints are compacted in the constraint block 1340. The compacted false paths are checked for larger than the allowed "through" blocks and, if found, these are eliminated from speed testing using the STA. This is done in block 1360. The false paths that are compacted are tested and verified for equivalence in the equivalence block 1370 and verification of paths are finally verified in block 1380 and passed on to the STA for timing check.

As seen in the block diagram, all the paths which have a number of "-through" element greater than the number fixed by the user are removed from the list of timing exception. These paths are not generated for checking. Once the compaction process is done, the result is checked and verified for equivalence of paths and use of false paths. The netlist with the compacted paths and constraints are sent to the STA. Such a path compaction enables the verification tool to run faster and complete the verification operation much faster than if all the individual paths have to be checked with individual constraints.

The inventions disclosed hereinabove may be implemented in various forms and embodied in a variety of systems that provide the benefits there from. In one embodiment of the disclosed invention the method is performed by way of executing a plurality of instructions on an appropriate system, e.g., a computer system, the outcome of such execution results in the inventions disclosed above. There the invention may be embodied as a computer software product designed to cause the execution of the instructions embodied therein on a computer system, such that the methods disclosed are executed. Furthermore, the invention may be embodied in a standalone apparatus capable of providing the benefits of the disclosed methods, or as an apparatus that amongst others may be capable of executing these methods.

What is claimed is:

1. A method for generating a verified circuit design, comprising:
   receiving a circuit design specification and one or more criteria associated with said circuit design specification;
   generating at least a design netlist and one or more constraints associated with said design netlist based on said received circuit design specification and criteria;

wherein said constraints comprise one or more constraints identifying false paths in said design netlist;

performing by a computing apparatus a functional analysis to determine if the generated design netlist and constraints meet the received circuit design specification and criteria;

if said generated design netlist and constraints meet the received circuit design specification and criteria in the functional analysis, performing at least one of path compaction and constraint compaction on said generated design netlist and constraints, wherein said path compaction comprises at least one of: if a plurality of paths in said design netlist each include a constant net, identifying all paths through said constant net as false paths with a common constraint; and, if the design netlist includes re-convergent nets, identifying all paths through said re-convergent nets as false paths with a common constraint;

performing by a computing apparatus a timing analysis on the compacted design netlist and constraints to determine if the compacted design netlist and constraints meet the received circuit design specification and criteria; and if said generated design netlist and constraints meet the received circuit design specification and criteria in the timing analysis, performing a path optimization on said compacted design netlist to generate a verified circuit design.

2. A path compaction apparatus comprising:

an input unit that receives at least a design netlist and one or more constraints associated with said design netlist; wherein said constraints comprise one or more constraints identifying false paths in said design netlist;

a compaction unit that performs at least one of path compaction and constraint compaction on the received design netlist and one or more constraints, wherein said path compaction comprises at least one of: if a plurality of paths in said design netlist each include a constant net, identifying all paths through said constant net as false paths with a common constraint; and if the design netlist includes re-convergent nets, identifying all paths through said re-convergent nets as false paths with a common constraint; and an output unit that outputs the compacted netlist and compacted constraints;

wherein said path compaction comprises at least one of removing at least one redundant through-element from one of said false paths and removing or compacting a list of a from-element or a to-element of at least one of said false paths.

3. The path compaction apparatus of claim 2, wherein said constraint compaction comprises combining a plurality of false paths to be identified by one constraint.

4. The path compaction apparatus of claim 3, wherein said combining comprises merging a from-list or a to-list of a first constraint with a from-list or a to-list of a second constraint, respectively, and keeping a through list of said first constraint if a through list of said second constraint is a subset of the through list of said first constraint.

5. The path compaction apparatus of claim 3, wherein said combining comprises merging a from-list and a to-list of a first constraint with a from-list and a to-list of a second constraint, respectively, if both said first constraint and said second constraint are defined with only a from-list and a to-list, all of the elements in the from-list of the first constraint are in a fan-in list of all of the elements of the to-list of the second constraint, and all of the elements in the from-list of the second constraint are in a fan-in list of all of the elements of the to-list of the first constraint.

6. The path compaction apparatus of claim 2, wherein said path compaction unit performs an extended path removal by identifying, with a constraint, a path as a false path of said design netlist if the path has more than a predetermined number of through-elements.

7. A path compaction method comprising:

receiving at least a design netlist and one or more constraints associated with said design netlist; wherein said constraints comprise one or more constraints identifying false paths in said design netlist;

performing by a computing apparatus at least one of path compaction and constraint compaction on the received design netlist and one or more constraints, wherein said path compaction comprises at least one of: if a plurality of paths in said design netlist each include a constant net, identifying all paths through said constant net as false paths with a common constraint; and if the design netlist includes re-convergent nets, identifying all paths through said re-convergent nets as false paths with a common constraint; and outputting the compacted netlist and compacted constraints;

wherein said path compaction comprises at least one of:

removing at least one redundant through-element from one of said false paths; and removing or compacting a list of a from-element or a to-element of at least one of said false paths.

8. The path compaction method of claim 7, wherein said constraint compaction comprises combining a plurality of false paths to be identified by one constraint.

9. The path compaction method of claim 8, wherein said combining comprises merging a from-list or a to-list of a first constraint with a from-list or a to-list of a second constraint, respectively, and keeping a through list of said first constraint if a through list of said second constraint is a subset of the through list of said first constraint.

10. The path compaction method of claim 8, wherein said combining comprises merging a from-list and a to-list of a first constraint with a from-list and a to-list of a second constraint, respectively, if both said first constraint and said second constraint are defined with only a from-list and a to-list, all of the elements in the from-list of the first constraint are in a fan-in list of all of the elements of the to-list of the second constraint, and all of the elements in the from-list of the second constraint are in a fan-in list of all of the elements of the to-list of the first constraint.

11. The path compaction method of claim 7, wherein said performing by a computing apparatus at least one of path compaction and constraint compaction on the received design netlist and one or more constraints comprises identifying, with a constraint, a path as a false path of said design netlist if the path has more than a predetermined number of through-elements.

12. A non-transitory tangible computer readable medium having stored thereon instruction to enable a computer executing said instructions to perform a path compaction method, said method comprising:

receiving at least a design netlist and one or more constraints associated with said design netlist; wherein said constraints comprise one or more constraints identifying false paths in said design netlist;

performing at least one of path compaction and constraint compaction on the received design netlist and one or more constraints, wherein said path compaction comprises at least one of: if a plurality of paths in said design netlist each include a constant net, identifying all paths through said constant net as false paths with a common constraint; and if the design netlist includes re-convergent nets, identifying all paths through said re-convergent nets as false paths with a common constraint; and outputting the compacted netlist and compacted constraints;

wherein said path compaction comprises at least one of:

removing at least one redundant through-element from one of said false paths; and removing or compacting a list of a from-element or a to-element of at least one of said false paths.

13. The computer readable medium of claim 12, wherein said constraint compaction comprises combining a plurality of false paths to be identified by one constraint.

14. The computer readable medium of claim 13, wherein said combining comprises merging a from-list or a to-list of a first constraint with a from-list or a to-list of a second constraint, respectively, and keeping a through list of said first constraint if a through list of said second constraint is a subset of the through list of said first constraint.

15. The computer readable medium of claim 13, wherein said combining comprises merging a from-list and a to-list of a first constraint with a from-list and a to-list of a second constraint, respectively, if both said first constraint and said second constraint are defined with only a from-list and a to-list, all of the elements in the from-list of the first constraint are in a fan-in list of all of the elements of the to-list of the second constraint, and all of the elements in the from-list of the second constraint are in a fan-in list of all of the elements of the to-list of the first constraint.

16. The computer readable medium of claim 12, wherein said performing by a computing apparatus at least one of path compaction and constraint compaction on the received design netlist and one or more constraints comprises identifying, with a constraint, a path as a false path of said design netlist if the path has more than a predetermined number of through-elements.

* * * * *